Figure 2:
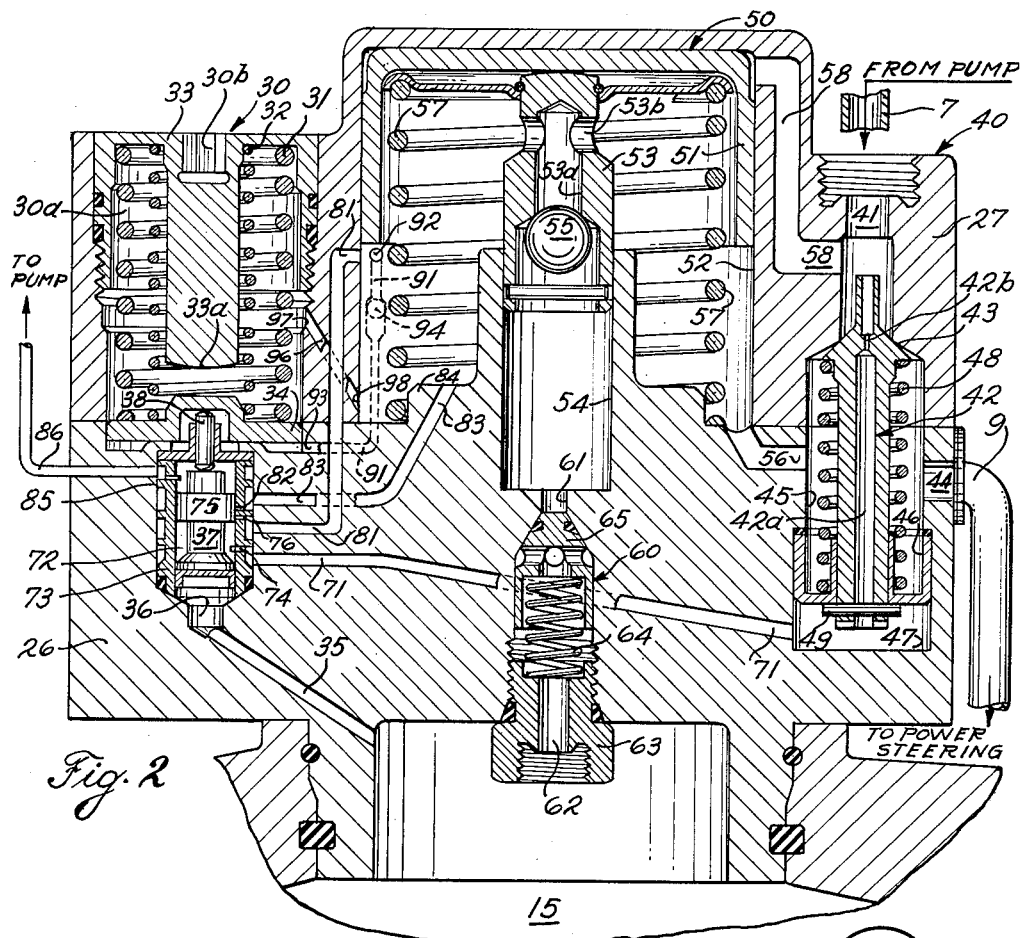

Sept. 18, 1962

R. T. MARETTE ETAL 3,054,261

PRESSURE INTENSIFIER

Filed June 14, 1961

INVENTORS
RALPH T. MARETTE
TADEUSZ BUDZICH
BY
RICHEY, McNENNY & FARRINGTON
Donald W. Farrington
ATTORNEYS United States Patent Office 3,054,261
Patented Sept. 18, 1962

3,054,261
PRESSURE INTENSIFIER
Ralph T. Marette, Cleveland Heights, and Budzich Tadeusz, Cleveland, Ohio, assignors to The Weatherhead Company, Cleveland, Ohio, a corporation of Ohio
Filed June 14, 1961, Ser. No. 117,155
18 Claims. (Cl. 60—51)

This invention relates to hydraulic apparatus and more particularly to apparatus utilizing components operated at relatively high pressures, and means for developing such high pressures by utilizing a relatively low pressure source.

The present invention is illustrated in the environment of a hydraulic system for a vehicle wherein the vehicle brake is arranged to utilize a small volume of hydraulic fluid at a high pressure such as, for example, 2000 pounds per square inch, and wherein such high fluid pressure is charged in an accumulator and the accumulator is charged by means of a relatively low pressure hydraulic pump for the power steering of the vehicle.

It is among the objects of the invention to provide hydraulic apparatus including an accumulator and a pressure intensifier for use with a low pressure hydraulic pump and wherein the pressure intensifier is characterized by a large diameter power piston and a relatively small diameter pumping piston, and wherein a movable restrictor is arranged in the path of the low pressure fluid flow, and wherein pressure differences developed by said restrictor are utilized to move the power piston and effect a pumping stroke of said pumping piston to move hydraulic fluid into the accumulator.

It is a further object of the invention to provide apparatus according to the preceding object wherein a device moved in response to demand in the accumulator controls the extent of restriction in the low pressure fluid flow path.

It is a further object of the invention to provide a pressure intensifier for an accumulator which comprises a valve moving in response to changes in accumulator pressure, and a movable restrictor mounted in a low pressure flow path, a power cylinder and a pumping cylinder driven thereby, said valve acting to move the restrictor to increase the pressure difference at the restriction in response to a pressure decrease in the accumulator, and said pressure difference at the restriction is utilized to move the power cylinder and pump fluid into said accumulator.

It is a further object of the invention to provide a pressure intensifier to move a small quantity of fluid under high pressures wherein a restrictor throat is formed in a relatively low fluid pressure flow path and a power piston is arranged with one side thereof open to the fluid flow path upstream from the restrictor throat and the other side of the power piston is open to the fluid flow path downstream from the restrictor throat and the restrictor element is moved toward and away from the throat in response to changes in the demand for high fluid pressure.

Figure 1:
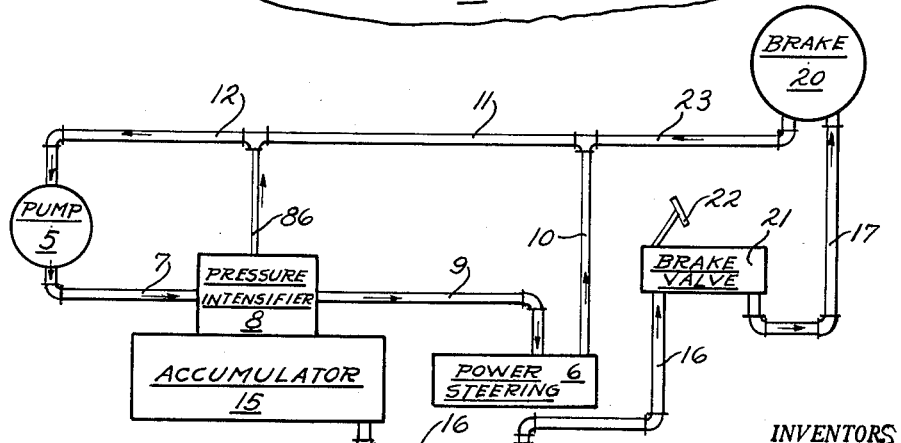

Further objects and advantages relating to efficiency in operation, accuracy in control and low cost of manufacture will appear from the following description and the appended drawings wherein:

FIG. 1 is a diagrammatic showing of a hydraulic system embodying the invention for a vehicle having a low pressure fluid system for power steering and a high pressure fluid system for brake operation; and FIG. 2 is a transverse sectional view showing a pressure intensifier made according to my invention and connected to an accumulator.

The apparatus of the present invention includes a power piston and a relatively smaller pumping piston which is operated thereby. The low pressure fluid flow is utilized to establish a pressure difference across the power piston and thereby move the small diameter pumping piston so as to pump relatively higher fluid pressure into an accumulator. The pressure differences across the power piston are accomplished by moving a movable restrictor toward and away from a restrictor throat in the flow path of the low pressure fluid. The movable restrictor is actuated by a piston and cylinder assembly and a metering orifice passage is arranged to lead fluid from above the restrictor throat to the underside of the restrictor piston acting to move the restrictor toward the throat and thereby increase the restriction in the flow path.

The movement of the restrictor is also governed by a valved passageway which leads from the underside of the restrictor piston to the upper side of the restrictor piston so that when the passageway is opened, the pressures are balanced on the opposite sides of the restrictor piston, and when the valved passageway is closed, the restrictor piston is responsive to flow from the metering orifice passage. Generally speaking, the valved passageway is closed in response to a demand for additional fluid in the accumulator and the valved passageway is opened when the demand is satisfied. The time, however, during which the valved passageway is closed is governed by the travel of the power piston so that when a pumping stroke is once started, the stroke will be completed before the valved passageway is opened and the restrictor permitted to move away from the restrictor throat.

Referring to the diagrammatic showing of FIG. 1, a gear pump 5 is arranged to be driven by the engine of the vehicle and the fluid flow path from the pump to the power steering unit 6 includes conduit 7 leading to the pressure intensifier 8 and conduit 9 leading to the power steering unit 6. Conduits 10, 11 and 12 complete the fluid flow path from the power steering unit 6 back to the pump 5.

Preferably the power steering unit is of the open center type so that a minimum load is imposed upon the pump by the power steering when the steering wheels are in a straight ahead position. The load imposed upon the pump by the power unit 6 would increase from a minimum at the open center position to a maximum when the steering wheels are cramped to one side or the other. Such power steering systems, including a pump 5 in the form of a gear pump, are well known. Ordinarily the power steering load imposes a requirement which develops about 300 pounds per square inch at the pump outlet. On occasions when the steering wheel is turned quickly to the "stop" position, a momentary high pressure condition, such as 750 pounds per square inch, may be developed in the lines 7 and 8 leading from the pump to the power steering unit 6.

An accumulator 15 is provided to store fluid pressure at relatively higher pressures than the maximum output of the pump 5. A typical installation may include an accumulator 15 adapted to store fluid pressure at 2000 pounds per square inch and such fluid pressure is available through conduits 16 and 17 to the high pressure hydraulic brake 20. A brake valve 21 is interposed between lines 16 and 17 and upon actuation of the brake pedal 22, high fluid pressure as, for example, 2000 pounds is directed to the brake 20. Spent hydraulic fluid from the brake 20 is directed from the brake by way of line 23 to the line 11 and thence back to the pump 5.

It will be understood that a reservoir, not shown, is mounted in connection with the pump 5 to receive and store spent hydraulic fluid coming from the power steering unit 6 and from the brake 20.

Referring to the power intensifier illustrated in FIG. 2, an intensifier body is formed by a section 26 connected to the accumulator 15 and a cap section 27 mounted on the section 26. The pressure intensifier includes an assembly indicated in its entirety as at 30 at the left-hand side of FIG. 2 which functions to sense the pressure in the accumulator and also insure that a pumping stroke is completed when demanded by the accumulator. Depending on the demand in the accumulator the assembly 30 will initiate the necessary actuation of parts so as to pump additional fluid into the accumulator. There is no operation of the intensifier unless occasioned by a decrease in accumulator pressure. An assembly indicated in its entirety as at 40 at the right-hand side of FIG. 2 operates to provide a variable restriction in the flow path from the pump 5 to the power steering unit 6.

The pressure intensifier includes an assembly indicated in its entirety as at 50 which assembly is centrally arranged in FIG. 2 and this assembly includes a power piston 51 which is adapted to be reciprocated and carry therewith a pumping piston 53 so as to pump hydraulic fluid into the accumulator at a pressure higher than any pressure available in the fluid flow path between the pump and power steering unit.

The pressure sensing assembly 30 includes springs 31 and 32 interposed between the cap 33 and a control piston 34. A passageway 35 leads from the accumulator 15 into the bottom of a spool valve chamber 36. The spool valve 37 is mounted for reciprocation and one end thereof bears against a pin 38 disposed between the control piston 34 and the spool valve 37. Generally speaking, the springs 31 and 32, acting through the control piston 34 and pin 38, tend to bias the spool valve 37 to its lowermost position in the spool valve chamber 36. A predetermined high fluid pressure from the accumulator 15, however, may act through passageway 35 to overcome the bias of the spring 31 and 32 and move the spool valve 37 upwardly. The travel of the control piston is limited in one direction when the upper surface of the control piston 34 bears against the bottom of the stem 33a carried by the cap 33.

The path of fluid flow from the pump 5 to the power steering unit 6 enters the pressure intensifier body section 27 at inlet 41 and, assuming that the movable restrictor 42 is moved downwardly away from the restrictor throat 43, the fluid from the pump exits at outlet 44 into the pipe 9 leading to the power steering unit 6.

A restrictor chamber 45 is formed in the main passageway downstream of the restrictor throat 43. The chamber 45 is closed at its lower end by the restrictor piston 46 mounted for movement in the restrictor cylinder 47. A coil spring 48 surrounds the restrictor body 42 and normally the spring 48 biases the restrictor piston 46 to the limit of its sliding movement along the restrictor 42 where it abuts a transverse pin 49. The restrictor 42 and its piston 46 normally move as a unit toward and away from the restrictor throat 43. The spring 48 is preloaded at about 300 pounds and momentary pressure surges exceeding 300 pounds may be accommodated by moving the restrictor 42 relative to the piston 46 and momentarily compressing spring 48.

The restrictor body 42 is provided with an axial bore 42a which is provided at its upper end with a metering orifice 42b. The metering orifice 42b provides a fluid metering passageway from the upstream side of the restrictor throat 43 to the restrictor cylinder 47 beneath the restrictor piston 46.

The assembly 50 includes a power piston 51 arranged to be reciprocated in a cylinder 52 and the upper side of the piston 51 is open to the fluid flow path between inlet 41 and the throat 43 by way of the passageway 58. The fluid pressure at the upper side of the piston 51 varies with the fluid pressure changes upstream of the restrictor throat 43.

A pumping piston 53 is carried by the power piston 51 and is arranged to be reciprocated thereby in the pumping cylinder 54. The piston 53 is provided with an axial bore 53a and a transverse bore 53b so that as the pumping piston 53 is raised, the ball check 55 at the underside of the piston 51 permits hydraulic fluid to fill the pumping cylinder 54.

A check valve assembly, indicated in its entirety as at 60, is disposed between the outlet 61 of the cylinder 54 and the bore 62 opening into the accumulator. A plug 63 supports a spring 64 arranged to lightly bias the valve member 65 upwardly to close the outlet 61. In the absence of high pressure in the accumulator 15, fluid from the pump 5 filling the cylinder 52 will move downwardly past the check valve 60 to fill the accumulator. It will be understood that high fluid pressure existing in the accumulator is also effective against the area of plug 65 to maintain the check valve in its closed position, as shown in FIG. 2.

A passageway 56 provides an opening between the lower end of the power cylinder 52 and the restrictor chamber 45 and thus it will be observed that the fluid pressure effective at the underside of the piston 51 varies with pressure changes downstream of the restrictor throat 43. A coil spring 57 is interposed between the bottom of the power cylinder 52 and the underside of the piston 51 operates to restore the power piston 51 to its "top" or full line position as shown. When the fluid pressure in the flow path upstream from the restrictor exceeds the fluid pressure downstream of the restrictor by a predetermined amount, the piston 51 will be moved downwardly in the cylinder 52 and thus effect a pumping stroke of the pumping piston 53.

The space in the cylinder 47 beneath the restrictor piston 46 is connected by means of the fluid passageways 71, 83 and 56 to the other side of the restrictor piston 46 when the accumulator is charged. Since such passageways provide a larger flow path than the flow path through the metering orifice 42b, the restrictor is in a free-float position and the fluid from the pump causes the restrictor to drift back away from the restrictor throat 43. However, when the flow path from the underside of the restrictor piston 46 and back to the upper side of the restrictor piston 46 is blocked by the spool valve 37, it is important that said flow path remain closed until the power cylinder 51 and its associated pumping cylinder 53 has completed its downward stroke. This cyclic control function is accomplished by joint actuation of the control assembly including the control piston 34 and the valving functions of the power piston 51. The structure provided prevents "hunting" of the spool valve as the accumulator pressure is being raised during a pumping stroke.

A transverse passageway 71 connects the restrictor cylinder 47 to the annular space 72 on the spool valve 37 when the spool valve 37 is in its lowered position. The cylindrical liner 73 surrounding the spool valve 37 is provided with spaced slots 74, 76, 82 and 85. The spool valve 37 includes a land 75 which closes the slots 76 and 82 in the sleeve 73 when the spool valve 37 is in its lowered position. When, however, the spool valve 37 is moved upwardly, it will uncover the slot 76 and thus place the annular space 72 in communication with a passageway 81 which terminates near the central portion in the wall of the power cylinder 52. Further upward movement of the spool valve 37 will uncover the slot 82 in the sleeve 73 and thus place the annular space 72 in communication with a passageway 83 which terminates near the bottom wall of cylinder 52 in the boss 84 which centers the spring 57.

A slot 85 formed in the sleeve 73 above the land 75 opens the space above the land 75 into bleed line 86. The bleed line 86 accommodates leakage in the spool valve and conducts such leakage back to the return line 12 going to the pump 5.

A passageway 91 terminates at its upper end at opening 92 in the wall of the cylinder 52 beneath the lower edge of the piston 51 when the piston is at its "top" position. The lower terminus of the line 91 is at 93 under the control piston 34 so that the space beneath the control piston 34 is connected to the opening 92. A check valve 94 is located in the line 91 which prevents fluid from moving upwardly in the line 91 and out into the space above the piston 51 when the piston 51 is in its lowermost position. Accordingly, when the control piston 34 is moved down, the fluid therebeneath is constrained to leak past the piston 34 into the spring chamber thereabove and this piston leakage dampens the motion of the piston 34 in response to the springs 31 and 32. In the event the control piston is raised against the spring bias 31 and 32 by the spool valve, the fluid in the control cylinder under the control piston 34 is retained by the operation of the check valve 94.

A passageway 96 is provided to permit fluid accumulating above the control piston 34 to be moved back into the cylinder 52. One end of the passageway 96 opens into the spring chamber 30a above the control piston 34 as at 97 and the other end of the passageway 96 opens into the cylinder 52 as at 98.

With the intensifier unit assembled as illustrated in FIG. 2, and without oil in the unit, the springs are in their pre-load position as illustrated in FIG. 2. The restrictor 42 would be moved downwardly into a free-flow position so as to permit unrestricted flow of fluid from the pump 5 into the inlet 41 and thence to the outlet 44 to the power steering unit 6. With the motor running and the pump 5 in operation, and the power steering turned to "stop" position, fluid pressure from the pump will fill the intensifier unit, open the check valve 55 and the check valve 60 so as to fill the accumulator and the cavities of the assembly with hydraulic fluid at pump pressure.

With the power steering turned away from the "stop" position, but also away from a center position, hydraulic fluid entering at inlet 41 will flow past the restrictor 42 which is spaced from the throat 43 and a slight differential of pressure will be developed across the restrictor valve. This slight differential will cause a flow of hydraulic fluid through the metering orifice 42b and down through the bore 42a of the restrictor 42 into the restrictor cylinder 47.

The differential pressure across the restrictor piston 46 will start the piston 46 and the restrictor 42 carried thereby to move toward the restrictor throat 43. As the restrictor 42 approaches the throat 43, the pressure difference across the throat 43 will increase and this will increase the rate of flow through the metering orifice 42b which, in turn, is reflected in an increasing differential across the piston 46 moving it toward the throat 43 until the required difference in pressure is obtained for operation of the power piston 51. Since the accumulator 15 has not been charged to high pressure, the spool valve 37 prevents flow out of the restrictor cylinder 47 by way of line 71.

The pressure differential at opposite sides of the power piston 51 is established by the passageways 58 and 56 located upstream and downstream, respectively, of the restrictor throat 43.

As the power piston 51 starts to move down in response to the pressure differences established, the lower edge of the piston covers the port 92 opening into the cylinder 52 and also closes the line 81 opening into the cylinder 52. The closing of the passageways 91 and 81 thus effected by movement of the piston 51 locks the control piston 34 in position and also insures that there will be no pressure drop beneath the restrictor piston 46 by way of fluid movement in passageways 71 and 81. Any small movement of the spool valve 37 which may be caused by increasing accumulator pressure through line 35 does not reduce the pressure in the restrictor cylinder 47 because movement of the spool valve land 75 uncovering the slot 76 does not allow fluid flow through line 81 as long as the power piston 51 covers the terminus of the line 81 at the mid-point of the wall of the cylinder 52.

As the power piston moves downwardly, the pumping piston 53 pumps hydraulic fluid at a high pressure out of the cylinder 54 past check valve 60 and into the accumulator 15. When the power piston 51 reaches the bottom of its stroke the port 92 at the upper terminus of the line 91 is then exposed to the fluid pressure at the upper side of the power piston 51. Such increase in fluid pressure moves fluid downwardly through line 91 past the check valve 94 to the underside of the control piston 34 and thus moves the control piston upwardly where it engages the bottom of the plug 33a.

Coincident with the upward movement of the control piston 34 is the upward movement of the spool valve 37 as permitted by the sliding pin 38 interposed between the end of the spool valve 37 and the control piston 34. The upward movement of the spool valve 37 causes the land 75 to uncover the slot 82 and thus connects the restrictor cylinder 47 with the bottom of the power cylinder 52 through the passageway 83. This movement of the spool valve results in free flow of fluid from the restrictor cylinder 47 beneath the restrictor piston 46 faster than such fluid moves down into the cylinder 47 through the metering orifice 42b. The free fluid flow through passageways 71, 83 and 56 balances the pressure at opposite sides of the piston 46. Under such balanced condition at opposite sides of the restrictor piston 46, the piston and restrictor 42 move away from the throat 43 and thus the differential across the restrictor throat drops to its minimum value. The drop in pressure differential at opposite sides of the restrictor throat is reflected by a corresponding drop in the pressure differential at opposite sides of the power piston 51 and the spring 57 beneath the power piston is thereupon effective to return the power piston 51 and the pumping piston 53 to the top of their stroke, as illustrated in FIG. 2.

The check valve 94 in line 91 is effective to maintain the fluid at the underside of the control piston 34. The control piston will move down slowly in response to the bias of the springs 31 and 32 because of the leakage through clearance provided at the edge of the piston 34.

As the control piston moves down, it moves the spool valve 37 down until the force of the springs 31 and 32 is balanced by the force exerted on the spool valve by the accumulator pressure. A predetermined drop in accumulator pressure, which is effective to lower the spool valve 37 sufficiently to close the slot 76, results in increasing fluid pressure in the restrictor cylinder 47 and the pumping cycle will then repeat. The spring bias provided with springs 31 and 32 may be varied by rotating the plug 33 on its threads in the body. Hex socket 30b facilitates adjustment. In the absence of a pressure drop in accumulator pressure, the slot 76 will remain open and fluid flowing downwardly through the metering orifice 43b can circulate through the spool valve out of slot 76, thence through passageway 81 into the cylinder 52 at the underside of the pumping piston 51.

The construction provided permits the simultaneous use of the power steering and the high pressure pumping cycle. In the normal use of the power steering a pressure of 200 pounds per square inch may be developed and a cycling of the intensifier in response to accumulator demand will then impose an additional 150 to 200 pounds on the power steering pump.

For purposes of illustration, the sensing assembly, including the control piston and spool valve, are arranged vertically in the intensifier body parallel to the pumping cylinder assembly and parallel to the movable restrictor assembly. It will be appreciated that the intensifier body may be machined economically so that the assembly 30 and the assembly 40 are arranged normal to the assembly 50 without changing the structure of the component parts and without changing the mode of operation of the parts as here described. I am aware that the three assemblies indicated here at 30, 40 and 50 may be made in separate bodies and may be spaced physically with respect to each other and connected by conduits so as to perform the operations here described.

Although I have described my invention in the environment of a motor vehicle utilizing a power steering unit operated by a relatively low pressure and a brake operated at a relatively high pressure, I am aware that the invention is useful in other environments. Certain machine tools may utilize a relatively high pressure for operation of a chuck and utilize lower pressures for the operation of other components. The invention is also useful in aircraft where it is desired to operate certain components with a small volume of hydraulic fluid at a high pressure and other components utilizing a larger quantity of fluid and operating at a relatively lower pressure.

Although I have illustrated and described my invention in considerable detail, it will be appreciated by those skilled in the art that numerous modifications may be made therein without departing from the scope of the invention as defined in the following claims:

What is claimed is:

1. Pressure intensifier apparatus for a hydraulic system having a pump, and an accumulator comprising a body having an inlet and an outlet, a main passageway connecting said inlet and said outlet, said hydraulic pump operating to maintain fluid flow through said main passageway, said main passageway having a restrictor throat between said inlet and said outlet, a large diameter power cylinder and a relatively smaller diameter pumping cylinder, a power piston in said power cylinder, a pumping piston in said pumping cylinder connected to and driven by said power piston, first conduit means connecting one side of said power piston to said main passageway between the restrictor throat and the inlet, second conduit means connecting the opposite side of said power piston and said main passageway between said throat and said outlet, a movable restrictor mounted in said main passageway between the outlet and said restrictor throat, a restrictor cylinder, a piston in said restrictor cylinder connected to said movable restrictor, a metering passageway connecting said restrictor cylinder to said main passageway between the restrictor throat and the inlet, said metering passageway having a metering orifice therein, a control passageway connecting said main passageway and said restrictor cylinder between said throat and the outlet, said control passageway providing a larger flow path to exhaust fluid from said restrictor cylinder faster than the fluid is admitted in the flow path provided through said metering passageway, a valve for said control passageway, spring means operatively connected to said valve normally biasing said valve to closed position, pressure responsive means operatively connected to said valve and to said accumulator tending to bias the valve to open position, a control cylinder, a control piston in said control cylinder, means operatively connected to said power cylinder and said control cylinder to retard said spring bias with respect to said valve during a pumping stroke of said pumping piston in response to movement of said power piston.

2. Pressure intensifier apparatus for a hydraulic system having a pump and an accumulator comprising a body having an inlet and an outlet, a main passageway connecting said inlet and said outlet, said pump connected to maintain fluid flow through said main passageway from inlet to outlet, said main passageway having a restrictor throat between said inlet and said outlet, a large diameter power cylinder and a relatively smaller diameter pumping cylinder, a power piston in said power cylinder, a pumping piston in said pumping cylinder, means connecting the pistons for joint actuation, first conduit means connecting one end of said power cylinder to said main passageway between the restrictor throat and the inlet, second conduit means connecting the opposite end of said power cylinder and said main passageway between said throat and said outlet, said power piston disposed between said first and second conduit means, a movable restrictor mounted in said main passageway between the outlet and said restrictor throat, a restrictor cylinder, a piston in said cylinder connected to said movable restrictor, a metering passageway connecting said restrictor cylinder to said main passageway between the restrictor throat and the inlet, said metering passageway having a metering orifice therein, a control passageway connecting said main passageway to said restrictor cylinder between the throat and said outlet, said control passageway providing a larger flow path than the flow path through said metering passageway, a valve for opening and closing said control passageway, spring means operatively connected to said valve normally biasing said valve to closed position, pressure responsive means operatively connected to said valve and to said accumulator tending to bias the valve to open position, a control cylinder, a control piston in said control cylinder, fluid passage means operatively connected to said control cylinder and said power cylinder, said fluid passage means being closed by said power piston during a pumping stroke of said pumping piston.

3. Pressure intensifier apparatus for a hydraulic system having a relatively low pressure pump and a relatively high pressure accumulator comprising a body having an inlet and an outlet, a main passageway connecting said inlet and said outlet, said pump connected to maintain fluid flow through said main passageway, said main passageway having a restrictor throat between said inlet and said outlet, a large diameter power cylinder and a relatively smaller diameter pumping cylinder, a power piston in said power cylinder, a pumping piston in said pumping cylinder connected to and driven by said power piston, said pumping cylinder output being connected to said accumulator, first conduit means connecting one side of said power piston to said main passageway between the restrictor throat and the inlet, second conduit means connecting the opposite side of said power piston and said main passageway between said throat and said outlet, spring means to bias the power piston to one end of its stroke, a movable restrictor mounted in said main passageway between the outlet and said restrictor throat, said restrictor effecting a predetermined high pressure in said first conduit means to move the power piston against said spring bias, a restrictor cylinder, a piston in said restrictor cylinder connected to said movable restrictor, a metering passageway connecting said restrictor cylinder to said main passageway between the restrictor throat and the inlet, said metering passageway having a metering orifice therein, a control passageway connecting said main passageway between the throat and the outlet to said restrictor cylinder, said control passageway providing a larger cross-sectional flow path than the flow path provided through said metering passageway, a valve for said control passageway, spring means operatively connected to said valve normally biasing said valve to closed position, pressure responsive means operatively connected to said valve and to said accumulator tending to bias the valve to open position, a control cylinder, a control piston in said control cylinder, fluid passage means connecting said power cylinder and said control cylinder, means operatively connecting said control piston and said last-named spring means, said power piston moving to close said fluid passage means during a pumping stroke.

4. In combination a continuously driven pump, a power steering unit, conduit means providing a path for hydraulic fluid from the pump to the steering unit, an accumulator for storing fluid at a pressure higher than the maximum output pressure of the pump, means for charging the accumulator from the fluid supply in said path comprising a power piston and a pumping piston moved thereby, said pumping piston having a diameter less than the diameter of the power piston, said conduit having a restrictor throat in said fluid path, a movable restrictor downstream from said throat, a passageway leading from said fluid path at the upstream side of said restrictor throat to one side of said power piston, a passageway leading from said path downstream of said restrictor throat to the other side of said power piston, means responsive to a pressure decrease in said accumulator to move said restrictor toward said throat to effect movement of said pistons in response to the pressure difference across said throat and thereby pump fluid into said accumulator.

5. In combination a continuously driven pump, conduit means providing a path for hydraulic fluid from the pump, an accumulator for storing fluid at a pressure higher than the maximum output pressure of the pump, means for charging the accumulator from the fluid supply in said path comprising a power piston and a pumping piston moved thereby, said pumping piston having a diameter less than the diameter of the power piston, said conduit having a restrictor throat in said fluid path, a movable restrictor downstream from said throat, a passageway leading from said fluid path at the upstream side of said restrictor throat to one side of said power piston, a passageway leading from said path downstream of said restrictor throat to the other side of said power piston, means responsive to a pressure decrease in said accumulator to move said restrictor toward said throat to effect movement of said pistons in response to the pressure difference across said throat and thereby pump fluid into said accumulator.

6. A continuously driven hydraulic pump, an intermittently operated hydraulic motor, means providing a path for fluid from said pump to said motor to operate the motor at a pressure below the maximum output pressure of the pump, an accumulator for storing hydraulic fluid at a pressure higher than the maximum output pressure of said pump, means to pump fluid from said path into said accumulator at said higher pressure comprising a restrictor throat in said path, a movable restrictor on the downstream side of said throat, a power piston mounted for reciprocation in a power cylinder, a pumping piston mounted for reciprocation in a pump cylinder, said pumping piston being driven by said power piston and said power piston having a cross-sectional area more than twice the cross-sectional area of the pumping piston, means to conduct fluid from said path upstream of said restrictor throat into said power cylinder at one side of the power piston, means to conduit fluid from said path downstream of said restrictor throat into said power cylinder at the other side of said power piston, means responsive to a decrease in pressure in said accumulator to move the restrictor toward said throat to effect a pressure difference on the opposite sides of said power piston and move the pumping piston to increase the fluid pressure in the accumulator.

7. A continuously driven hydraulic pump, an intermittently operated hydraulically actuated device, means providing a path for fluid from said pump to said device to operate the device at a pressure below the maximum output pressure of the pump, an accumulator for storing hydraulic fluid at a pressure higher than the maximum output pressure of said pump, means to pump fluid from said path into said accumulator at said higher pressure comprising a restrictor throat in said path, a movable restrictor on the downstream side of said throat, a power piston mounted for reciprocation in a power cylinder, a pumping piston mounted for reciprocation in a pump cylinder, said pumping piston being driven by said power piston and said power piston having a cross-sectional area greater than the cross-sectional area of the pumping piston, means to lead fluid from said path upstream of said restrictor throat into said power cylinder at one side of the power piston, means to lead fluid from said path downstream of said restrictor throat into said power cylinder at the other side of said power piston, means responsive to a decrease in pressure in said accumulator to move the restrictor toward said throat to effect a pressure difference on the opposite sides of said power piston and move the pumping piston to increase the fluid pressure in the accumulator.

8. A pressure intensifier for charging an accumulator comprising a body having a passageway for moving hydraulic fluid through the body, said passageway having an inlet and an outlet and a restrictor throat between the inlet and outlet, a restrictor mounted for movement toward and away from said throat in the passageway between the throat and the said outlet, a power cylinder, a power piston mounted for reciprocation in the power cylinder, a pumping cylinder, a pumping piston connected to and driven by said power piston mounted for reciprocation in said pumping cylinder, said pumping cylinder output connected to said accumulator, said body having a first conduit leading from said passageway between the inlet and the restrictor throat to one side of said power piston, said body having a second conduit leading from said passageway between the restrictor throat and the outlet to the other side of said power piston, means responsive to a decrease in pressure in said accumulator effecting a movement of said restrictor toward said restrictor throat and thereby moving the power piston and pumping piston to discharge the pumping cylinder output into said accumulator.

9. Hydraulic intensifier apparatus comprising a pump, conduit means providing a path for fluid moved by said pump, said conduit means including a passageway having an inlet and an outlet, said passageway having a restrictor throat between said inlet and said outlet, a restrictor body mounted in said passageway between said restrictor throat and said outlet, said restrictor body comprising a nose portion adapted to open and close the passageway at said restrictor throat in response to movement away from and toward said restrictor throat, said passageway having a restrictor cylinder formed therein concentric of said restrictor body, said restrictor body having an elongated bore therethrough, said bore terminating at one end in the nose portion of the restrictor body, a metering orifice in the bore and the other end of said bore terminating in said restrictor cylinder, a restrictor piston mounted on the restrictor body and adapted to be reciprocated within said restrictor cylinder, a conduit leading from said restrictor cylinder at one side of said restrictor piston into said passageway at the other side of said restrictor piston, said conduit providing a fluid flow path having a greater cross-sectional area than the cross-sectional area of said metering orifice, pressure responsive valve means in said last-named conduit to prevent flow from said one side of said piston to said other side of said restrictor piston whereby fluid moving into the restrictor body through said metering orifice and into said restrictor cylinder moves the restrictor piston and the restrictor body toward said restrictor throat.

10. Hydraulic intensifier apparatus comprising a pump, conduit means providing a path for fluid moved by said pump, said conduit means including a passageway having an inlet and an outlet, said passageway having a restrictor throat between said inlet and said outlet, a restrictor body mounted in said passageway between said restrictor throat and said outlet, said restrictor body having a portion at one end adapted to open and close the passageway at said restrictor throat in response to movement away from and toward said restrictor throat, said restrictor body having a restrictor piston at the other end thereof, a restrictor cylinder to receive said restrictor piston, a metering passageway having a metering orifice therein, said metering passageway opening into said fluid path between the inlet and restrictor throat at one end and opening into said restrictor cylinder at the underside of said restrictor piston at its other end, a valved passageway leading from the underside of said restrictor piston to the upper side thereof, said valved passageway providing a fluid flow path having a greater cross-sectional area than the cross-sectional area of said metering orifice, pressure responsive valve means in said valved passageway to prevent flow from the underside of said piston to the upper side of said piston when the valve is closed whereby fluid moving into the restrictor cylinder through said metering orifice passageway moves the restrictor piston and the restrictor body toward said restrictor throat.

11. Hydraulic intensifier apparatus comprising a hydraulic pump, a main passageway for fluid received from said pump having an inlet and an outlet, said main passageway having a restrictor throat between said inlet and said outlet, a restrictor body mounted for movement in said main passageway between said restrictor throat and said outlet, said restrictor body having one end portion adapted to open and close the main passageway at said restrictor throat in response to movement away from and toward said restrictor throat, said main passageway having a restrictor cylinder formed therein in alignment with said restrictor body and surrounding the other end of said body, said restrictor body having an elongated bore therethrough, said bore opening into said main passageway upstream with respect to said restrictor throat, said bore having a metering orifice and opening into said restrictor cylinder, a restrictor piston mounted on the restrictor body and adapted to be reciprocated within said restrictor cylinder, a valved passageway leading from said restrictor cylinder at the underside of said restrictor piston into said main passageway at the upper side of said restrictor piston, said valved passageway when open providing a fluid flow path having a greater cross-sectional area than the cross-sectional area of said metering orifice, pressure responsive valve means in said valved passageway movable to a closed position to prevent flow from the underside of said piston to the upper side of said piston whereby fluid moving into the restrictor body through said metering orifice and into said restrictor cylinder moves the restrictor piston and the restrictor body toward said restrictor throat.

12. In combination an accumulator, a continuously operated pump, hydraulic intensifier means for charging the accumulator, said intensifier comprising a body having a passageway therein, an inlet for said passageway, an outlet for said passageway, means to direct fluid flow from said pump to said inlet, said intensifier having a power cylinder and a pumping cylinder therein, means to fill said pumping cylinder with fluid from said passageway, a power piston mounted in said power cylinder, a pumping piston connected to said power piston and arranged to be reciprocated thereby in said pumping cylinder, means connecting the output of said pumping cylinder to said accumulator, said passageway having a restrictor throat between said inlet and said outlet, a restrictor assembly mounted for movement toward and away from said throat, said assembly including a tubular restrictor body having one end thereof proportioned to close said restrictor throat when the restrictor body is moved to the restrictor throat, said assembly including a piston mounted at the other end of said tubular body, said tubular body having a metering orifice therein to direct fluid through the body to the underside of said piston to move the piston and restrictor body toward said restrictor throat and develop a fluid pressure difference at opposite sides of the restrictor throat, means to direct fluid from said passageway at opposite sides of the restrictor throat to opposite sides of said power piston, means moving in response to an increase in pressure in said accumulator to open a passageway from the underside of said restrictor piston to the upper side of said restrictor piston and thereby move the restrictor assembly away from the restrictor throat and decrease the pressure difference of the fluid at opposite sides of the restrictor throat.

13. In combination an accumulator, a continuously operated pump, hydraulic intensifier means for charging the accumulator, said intensifier comprising a body having a main passageway therein, an inlet for said passageway, an outlet for said passageway, a conduit to direct fluid flow from said pump to said inlet, said intensifier having a power cylinder and a pumping cylinder therein, means to fill said pumping cylinder from said main passageway, a power piston mounted in said power cylinder, a pumping piston connected to said power piston and arranged to be reciprocated thereby in said pumping cylinder, means connecting the output of said pumping cylinder to said accumulator, said main passageway having a restrictor throat between said inlet and said outlet, a restrictor body mounted for movement toward and away from said throat, said restrictor body having one end thereof proportioned to close said restrictor throat when the restrictor body is moved to the restrictor throat, said restrictor body having a piston mounted at the other end thereof, a cylinder for the restrictor piston, a secondary passageway having a metering orifice therein to direct fluid from above the restrictor to the underside of said piston to move the piston and restrictor body toward said restrictor throat and develop a fluid pressure difference at opposite sides of the restrictor throat, means to direct fluid from said passageway at opposite sides of the restrictor throat to opposite sides of said power piston, means moving in response to a decrease in pressure in said accumulator to close a fluid path from the underside of said restrictor piston to the upper side of said restrictor piston and thereby move the restrictor body toward the restrictor throat and increase the pressure difference between the fluid at either side of the restrictor throat, and means controlled by the power piston to maintain said fluid path closed until the power piston has completed its stroke.

14. In combination an accumulator, a continuously operated pump, hydraulic intensifier means for charging the accumulator, said intensifier comprising a body having a main passageway therein, an inlet for said passageway, an outlet for said passageway, a conduit to direct fluid flow from said pump to said inlet, said intensifier having a power cylinder and a pumping cylinder therein, means to fill said pumping cylinder from said main passageway, a power piston mounted in said power cylinder, a pumping piston connected to said power piston and arranged to be reciprocated thereby in said pumping cylinder, said pumping cylinder having a diameter less than the diameter of the power cylinder, means connecting the output of said pumping cylinder to said accumulator, said main passageway having a restrictor throat between said inlet and said outlet, a restrictor assembly mounted for movement toward and away from said throat, said assembly including a restrictor body having one end thereof proportioned to close said restrictor throat when the restrictor body is moved to the restrictor throat, said restrictor assembly including a piston mounted at the other end of said body, a cylinder for the restrictor piston, a secondary passageway having a metering orifice therein to direct fluid from above the restrictor to the underside of said piston to move the piston and restrictor body toward said restrictor throat and develop a fluid pressure difference at opposite sides of the restrictor throat, means to direct fluid from said main passageway at opposite sides of the restrictor throat to opposite sides of said power piston, valve means moving in response to an increase in pressure in said accumulator to open a fluid path from the underside of said restrictor piston to the upper side of said restrictor piston and thereby move the restrictor assembly away from the restrictor throat and decrease the pressure difference between the fluid at either side of the restrictor throat, a control cylinder having a control piston therein, said control piston operatively connected to said valve means to maintain the valve means open in response to said increased accumulator pressure.

15. In combination a continuously operating pump, an accumulator for storing hydraulic fluid at a pressure higher than the maximum pressure output of said pump, an intermittently actuated device using relatively small volume of said high pressure fluid from said accumulator, a pressure intensifier for charging said accumulator comprising a body having an inlet and an outlet, a main passageway connecting the inlet and outlet, said inlet being connected to the output side of said pump and said outlet being connected to a return line directing fluid back to the pump to provide a continuous flow of hydraulic fluid between said inlet and said outlet, a pressure sensing valve arranged to be moved in one direction in response to a predetermined decrease in accumulator fluid pressure and in an opposite direction in response to a predetermined increase in accumulator fluid pressure, said body having a pumping cylinder formed therein, means to connect the output side of said pumping cylinder to said accumulator, a power cylinder in said body having a piston therein, said power cylinder having a greater cross-sectional area than the cross-sectional area of said pumping cylinder, a restrictor throat in said main passageway between said inlet and said outlet, a first conduit connecting said main passageway between the inlet and the restrictor throat to one side of the power piston, a second conduit connecting said main passageway between the restrictor throat and the outlet to the other side of said power piston whereby a predetermined pressure difference at opposite sides of the restrictor throat moves the power piston and the pumping piston carried thereby to pump fluid into said accumulator, a movable restrictor mounted in said passageway between said throat and said outlet, a restrictor piston carried by said restrictor, a cylinder within which said restrictor piston is reciprocated, said restrictor having a metering orifice to lead hydraulic fluid from said passageway between the restrictor throat and said inlet into said restrictor cylinder effective to move the restrictor piston and the restrictor carried thereby toward said restrictor throat, control conduit means connecting said restrictor cylinder at one side of said restrictor piston to the other side of said restrictor piston, said pressure responsive means closing said control conduit means in response to a predetermined decrease in accumulator pressure, and opening said last-named conduit means in response to a predetermined increase in accumulator pressure.

16. In combination a continuously operating pump, an accumulator for storing hydraulic fluid at a pressure higher than the maximum pressure output of said pump, an intermittently actuated device using relatively small volume of said high pressure fluid from said accumulator, a pressure intensifier for charging said accumulator comprising a body having an inlet and an outlet, a main passageway connecting said inlet and outlet, said inlet being connected to the output side of said pump and said outlet being connected to a return line directing fluid back to the pump to provide a continuous flow of hydraulic fluid through said main passageway between said inlet and said outlet, a pressure sensing valve arranged to be spring biased in one direction in response to a predetermined decrease in accumulator fluid pressure and to be moved in an opposite direction in response to a predetermined increase in accumulator fluid pressure, said body having a pumping cylinder formed therein, means to connect the output side of said pumping cylinder to said accumulator, a power cylinder in said body having a piston therein, said power cylinder having a greater cross-sectional area than the cross-sectional area of said pumping cylinder, a restrictor throat in said main passageway between said inlet and said outlet, a first conduit connecting said main passageway between the inlet and the restrictor throat to one side of the power piston, a second conduit connecting said main passageway between the restrictor throat and the outlet to the other side of said power piston whereby a predetermined pressure difference at opposite sides of the restrictor throat moves the power piston and the pumping piston carried thereby to pump fluid into said accumulator, a movable restrictor mounted in said passageway between said throat and said outlet, a restrictor piston connected to said restrictor, a cylinder within which said restrictor piston is reciprocated, a metering passageway having a metering orifice therein to lead hydraulic fluid from said main passageway between the restrictor throat and said inlet into said restrictor cylinder to move the restrictor piston and the restrictor connected thereto toward said restrictor throat, control conduit means connecting said restrictor cylinder at one side of said restrictor piston to the other side of said restrictor piston, said pressure sensing valve closing said control conduit means in response to a predetermined decrease in accumulator pressure, and means responsive to power cylinder movement to maintain said control conduit closed until the pumping cylinder has completed a pumping stroke.

17. Hydraulic intensifier apparatus for charging an accumulator comprising a body, said body having an inlet and an outlet and a passageway between said inlet and said outlet, said passageway having a restrictor throat between the inlet and the outlet, a movable restrictor mounted in said passageway between said restrictor throat and said outlet, said restrictor being effective when moved to a position adjacent the throat to cause a pressure difference between the inlet and the throat and the throat and said outlet, a power cylinder in said body, a power piston mounted for reciprocation in the power cylinder, a pumping cylinder in said body, said pumping cylinder being relatively smaller than said power cylinder, a piston reciprocated in said pumping cylinder by the power piston, the opposite sides of said power piston being connected to said passageway at opposite sides of said restrictor throat to effect reciprocation of the power piston in response to a predetermined pressure difference across said restrictor throat, said body having a restrictor cylinder and a reciprocating restrictor piston mounted therein to move said restrictor, a control passageway connecting said restrictor cylinder and said outlet, fluid pressure responsive means to control the direction of movement of said restrictor piston comprising a spool valve mounted for reciprocation in said body, spring means to bias the spool valve in one direction and means open to the hydraulic fluid pressure in said accumulator to bias the spool valve in an opposite direction, said spool valve when moved in one direction in response to said spring means being effective to close said control passageway leading from said restrictor cylinder to said outlet, said spool valve when moved in an opposite direction in response to a predetermined high accumulator pressure effecting an opening of said control passageway between said restrictor cylinder and said outlet.

18. Hydraulic intensifier apparatus for charging an accumulator comprising a body, said body having an inlet and an outlet and a main passageway between said inlet and said outlet, said main passageway having a restrictor throat between the inlet and the outlet, a movable restrictor mounted in said passageway between said restrictor throat and said outlet, said restrictor being effective when moved to a position adjacent the throat to cause a pressure difference at opposite sides of the throat, a power cylinder in said body, a power piston mounted for reciprocation in the power cylinder, a pumping cylinder in said body, said pumping cylinder being relatively smaller than said power cylinder, a piston reciprocated in said pumping cylinder by the power piston, the opposite sides of said power piston being connected to said main passageway at opposite sides of said restrictor throat to effect reciprocation of the power piston in response to a predetermined pressure difference at said restrictor throat, said body having a restrictor cylinder and a reciprocating restrictor piston mounted therein to move said restrictor, a control passageway connecting opposite ends of said restrictor cylinder, fluid pressure responsive means to control the direction of movement of said restrictor piston comprising a valve mounted for reciprocation in said body, spring means to bias the valve in one direction, pressure conduit means leading to said accumulator to bias the valve in an opposite direction, said valve when moved in said one direction in response to said spring means being effective to close said control passageway, said valve when moved in an opposite direction in response to a predetermined high accumulator pressure effecting an opening of said passageway between said restrictor cylinder and said outlet, and a control cylinder and piston to restrain said spring means and delay the opening of said valve until the pumping piston has completed a pumping stroke.

References Cited in the file of this patent
UNITED STATES PATENTS
2,881,706  Haynes et al. _____ Apr. 14, 1959